United States Patent [19]

Lendaro

[11] Patent Number: 5,034,666
[45] Date of Patent: Jul. 23, 1991

[54] POWER SUPPLY FOR AN ELECTRODE OF A CRT

[75] Inventor: Jeffery B. Lendaro, Noblesville, Ind.

[73] Assignee: Thomson Consumer Electronics, Inc., Indianapolis, Ind.

[21] Appl. No.: 508,438

[22] Filed: Apr. 13, 1990

[51] Int. Cl.$^5$ .......................... H01J 29/70; H04N 5/63
[52] U.S. Cl. ..................................... 315/411; 358/190
[58] Field of Search .......................... 315/411; 358/190

[56] References Cited

U.S. PATENT DOCUMENTS 4,649,325 3/1987 Guerin et al. ..................... 315/383
4,812,720 3/1989 Haferl ................................ 315/411

OTHER PUBLICATIONS

A Color Television Service Data Manual, publ. 1987 for CTC 140 Television Chassis, a schematic page and a cover sheet.
A Color Television Service Data Manual, publ. 1987 for CTC 131 Television Chassis, a schematic page and a cover sheet.

Primary Examiner—Gregory C. Issing
Attorney, Agent, or Firm—Joseph S. Tripoli; Joseph J. Laks; Sammy S. Henig

[57] ABSTRACT

To produce a cathode voltage of a cathode ray tube that provides black level compensation, a secondary winding of a flyback transformer is coupled in series with a resistor, a capacitor and a rectifying diode. During flyback, a voltage pulse is developed across the capacitor at a magnitude that is increases when the average value of the beam current increases. The voltage pulse causes the cathode voltage to first decrease when the beam current increases.

23 Claims, 1 Drawing Sheet

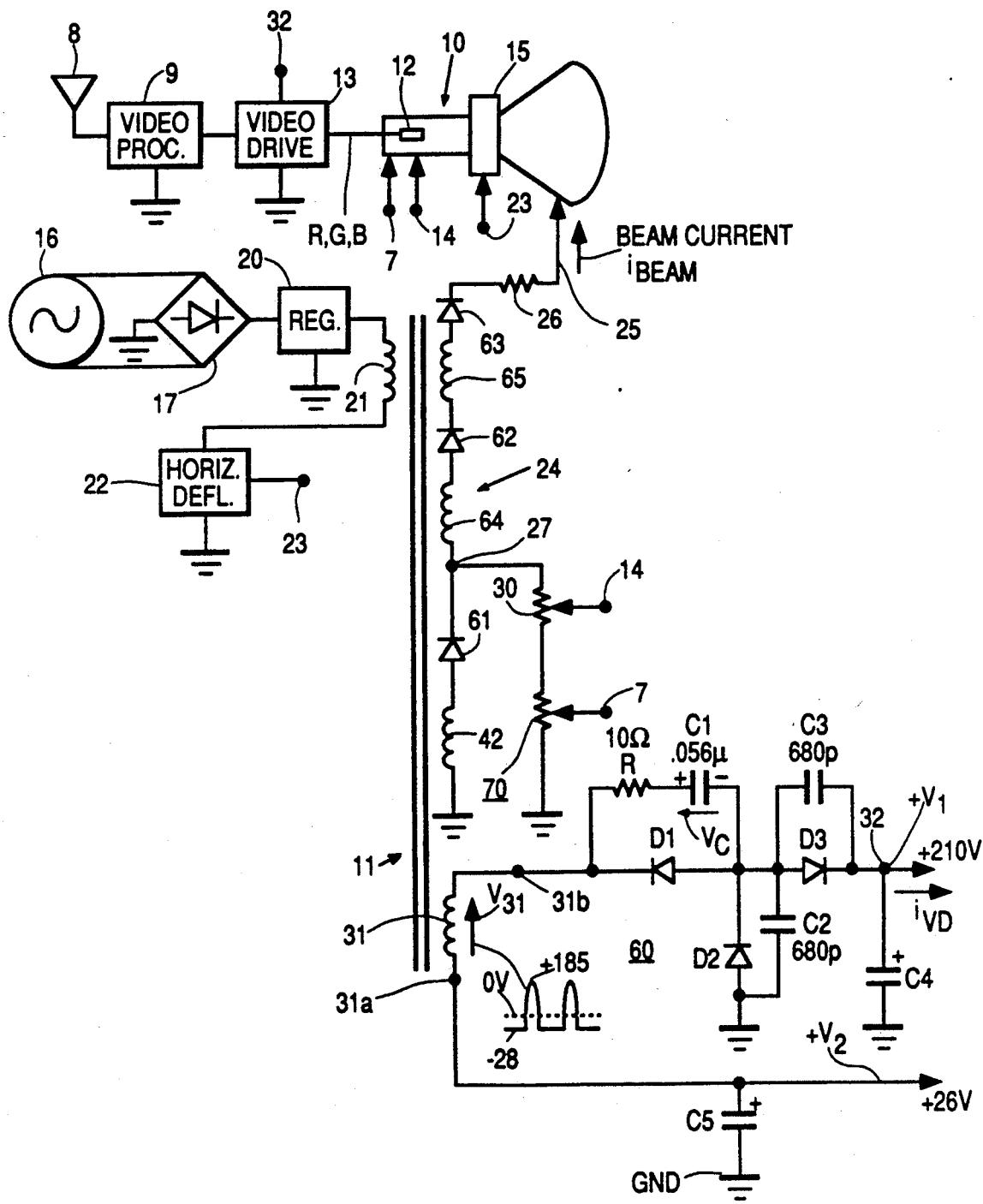

POWER SUPPLY FOR AN ELECTRODE OF A CRT

The invention relates to a power supply for an electrode voltage developed at an electrode of a cathode ray tube (CRT).

The electron gun assembly of a CRT produces one or more electron beams which impinge upon a phosphor display screen in a predetermined pattern to form a scanned raster. An electron gun assembly is designed to produce a number of spatial regions of different voltage potentials through which the electron beam or beams pass. One of such voltage potentials is produced by a screen voltage at a screen or G2 electrode of the CRT. Video signals, for example, R, G and B are developed at the cathodes of the CRT having three beams to control currents in the cathodes. A given video signal is applied to the cathode via a video driver stage that is energized by a DC supply voltage. The supply voltage is DC-coupled to the cathode through the video driver stage.

A predetermined level in the video signal is referred to by the term "black level". When a portion of the video signal that is at the black level is developed at the corresponding CRT cathode, such portion signal, preferably, should produce a threshold of a zero beam or cathode current. The cathode voltage level that occurs when the video signal is at the black level is determined by the supply voltage of the video driver stage that is DC-coupled to the cathode of the CRT.

The video driver stage supply voltage may be generated by providing a secondary winding of a high voltage or flyback transformer. The electron gun assembly may utilize a high voltage winding of the transformer to provide a focus voltage. A voltage divider responsive to the focus voltage provides the screen voltage for the screen electrode. An increase, for example, in electron beam current, due to an increase in picture brightness, may cause the screen voltage to become smaller as a result of increased beam current loading of the high voltage winding. In order to maintain proper black level of the video signal at the cathode of the CRT for different levels of the screen voltages caused by beam current loading variations, it may be desirable to decrease the video driver stage supply voltage level when the beam current increases, and vice versa. Thus voltage tracking between the cathode and screen voltages may be required.

One prior art arrangement utilized a relative large resistor in series with the video driver stage supply voltage. When the beam current increases, the screen voltage tends to decrease. Consequently a voltage drop across the series resistor caused by the increased cathode current reduces the video driver stage supply voltage for providing the aforementioned voltage tracking. Disadvantageously, the power dissipation in the resistor is relatively high. Furthermore, should the cathode of the CRT be short-circuited to ground, the power dissipated in the resistor may locally heat a printed circuit surface on which such a resistor is typically mounted, causing a damage to the printed circuit.

Therefore, it may be desirable to provide such voltage tracking in the video driver stage supply voltage as a function of the beam current using a reactive element such as a capacitor that does not dissipate power.

In accordance with an aspect of the invention, a source of an input supply voltage is coupled to a reactive element for generating voltage pulses in the reactive element at a magnitude that is indicative of, for example, an average beam current. A cathode electrode voltage of the CRT is developed in accordance with the magnitude of the voltage pulses to provide black level compensation.

The sole FIGURE illustrates a schematic and block diagram of a portion of a video display apparatus that includes a power supply, embodying an aspect of the invention, for a video driver stage of a CRT.

Referring to the sole FIGURE, there is shown a portion of a video display apparatus including a CRT 10 and a high voltage transformer 11. Video signals illustratively received via an antenna 8 are applied to video processing circuitry 9, which demodulates and decodes the signal in an appropriate manner for application to video drive circuit 13. Outputs of video drive circuit 13 such as signals R, G and B are applied to cathodes of an electron gun assembly 12 of CRT 10. Electron gun assembly 12, when energized, may illustratively produce three electron beams. Various operating voltage levels may be applied to electron gun assembly 12, including a focus voltage level via a terminal 14 and a screen voltage via a terminal 7. The electron beams are deflected to form a scanned raster by deflection yoke 15.

A source of AC voltage 16 is coupled to a rectifying circuit 17 which produces an unregulated DC voltage level that is applied to a regulator circuit 20. Regulator 20 may illustratively be of various types, such as switched-mode or SCR regulators. The output of regulator 20 is a regulated DC voltage that is applied to one terminal of a primary winding 21 of high voltage transformer 11. The other terminal of primary winding 21 is coupled to a horizontal deflection circuit 22 which generates a horizontal deflection current that is applied to the horizontal deflection windings of deflection yoke 15 via terminal 23.

High voltage transformer 11 includes a high voltage winding 24, comprising winding segments 42, 64 and 65, and rectifying diodes 61, 62 and 63, which is energized by primary winding 21 during the horizontal retrace or flyback interval. Winding 24 produces a high voltage level that is applied to the anode terminal of CRT 10 via conductor 25. During horizontal trace, the regulated DC voltage is developed across primary winding 21.

A tap 27 on high voltage winding 24 is coupled to a voltage divider 70 to provide the focus voltage that is applied to electron gun assembly 12 via terminal 14. Tap 27 is selected so that the focus voltage is nominally of the order of one-third the high voltage level. Voltage divider 70 also provides the screen voltage that is applied to gun assembly 12 via terminal 7.

High voltage transformer 11 also includes a load circuit supply winding 31 which, via a rectifying stage 60, embodying an aspect of the invention, produces a voltage level $+V_1$ at a terminal 32. Voltage level $+V_1$ may illustratively be of the order of $+210$ volts at a low beam current. Voltage level $+V_1$ is applied to video drive circuit 13. Voltage level $+V_1$ is DC-coupled to the cathodes of gun assembly 12 via circuit 13.

As the electron beam current is increased due to, for example, viewer adjustment of the brightness control or due to changes in the picture scene brightness, the ultor voltage and, hence, the screen voltage decrease. In order to maintain a proper black level in video signals R, G and B at the cathodes of CRT 10 at the increased beam current level and also at lower beam current level, it may be desirable to decrease voltage level $+V_1$ as a function of the decrease in the screen voltage that occurs as a result of the increase in the beam current.

In accordance with an aspect of the invention, rectifying stage 60 causes voltage level $+V_1$ to decrease when the beam current increases, and vice versa, to provide voltage tracking between the screen voltage and the DC voltages at the cathodes of CRT 10 so as to maintain proper black level.

During the trace interval of a deflection cycle, a trace voltage $V_{31}$ is developed across winding 31 of flyback transformer 11, in a well known manner. Trace voltage $V_{31}$ is, for example, $-28$ volts. A pair of diodes D1 and D2 that are poled to be conductive during trace are coupled between a terminal 31b of winding 31 and a ground or common conductor GND. Diodes D1 and D2 couple trace voltage $V_{31}$ across a filter capacitor C5 for developing a positive voltage level $+V_2$ across capacitor C5 at a terminal 31a of winding 31. Because of the forward voltage drop in diodes D1 and D2, voltage level $+V_2$ is approximately $+26$ volts. Diodes D1 and D2 maintain low impedance to ground conductor GND at terminal 31b of winding 31, during a portion of trace.

A capacitor C1 forms a series arrangement with a resistor R. During horizontal trace, the series arrangement of capacitor C1 and resistor R is coupled in parallel with conductive diode D1 and in series with diode D2. Diode D1 discharges capacitor C1 and causes a voltage $V_C$ across capacitor C1 to be approximately zero during and at the end of trace.

The number of winding turns of winding 31 is selected to produce voltage $V_{31}$ at a 213 volt peak-to-peak voltage across winding 31. During horizontal retrace or flyback, voltage $V_{31}$ across winding 31 is coupled in series with voltage level $+V_2$ to produce a peak voltage of approximately $+213$ volts at terminal 31b.

In accordance with an inventive feature, the voltage at terminal 31b is coupled via resistor R, via capacitor C1 and via a rectifying diode D3 to terminal 32 for developing voltage level $+V_1$ across a filter capacitor C4 that is a peak rectified voltage.

Prior to the instant when diode D3 becomes conductive, voltage $V_C$ across capacitor C1 is approximately zero, as explained before. When diode D3 conducts, during flyback, voltage $V_C$ gradually increases to form a pulse voltage as a result of the current that charges capacitor C1.

When the average beam current increases, the cathode current in CRT 10 increases and so does the average value of a current $i_{VD}$ that is supplied to video driver stage 13 from terminal 32. Therefore the average value of the forward current through diode D3, during each flyback interval, is larger when the average value of the beam current is larger. The larger is the average of the forward current in diode D3 that flows also in capacitor C1, the larger is the pulse voltage of voltage $V_C$ that is developed across capacitor C1 and the larger is the voltage drop across resistor R, during flyback. For a given magnitude of the beam current, the magnitude of the voltage pulse of voltage $V_C$ in capacitor C1 is determined by the value of capacitor C1. The larger is the sum of the voltages that are developed across capacitor C1 and across resistor R, the smaller is the voltage that is developed at the anode of diode D3. Therefore, the larger is the beam current, the smaller is voltage level $+V_1$ that is rectified by diode D3 and the smaller is the cathode voltage of CRT 10. In this way, the decrease in voltage level $+V_1$ or in the cathode voltage of CRT 10 tracks the decrease in the level of the screen voltage that is incidental to the increase in the beam current. The reduction in voltage level $+V_1$ is, for example, 3.0 volts, at a low beam current of 50 $\mu$A and 17 volts, at a high beam current of 1600 $\mu$A. Such voltage reduction is obtained as a result of the voltage pulses that are developed across each of capacitor C1 and resistor R at magnitudes that are proportional to the beam or cathode current.

In accordance with an inventive feature, the voltage pulses that are developed across capacitor C1 form a significant portion of a voltage drop across the series arrangement of capacitor C1 and resistor R. Such portion may be, for example, 80%. Advantageously, capacitor C1 that is a reactive element does not dissipate energy as a result of the voltage pulses of voltage $V_C$. Resistor R limits the peak current in diode D3 and in capacitor C1. Consequently, the power dissipation in resistor R is smaller than in the aforementioned prior art circuit in which a capacitor analogous to capacitor C1 is not used.

Furthermore, should capacitor C4 be short-circuited, the voltage drop across capacitor C1 will reduce the portion of the voltage across winding 31 that is applied across resistor R, thus reducing the power dissipation in resistor R. As a result, such fault condition may not result in a damage to the printed circuit by the heat produced in resistor R. Because capacitor C1 is included, the heat produced there is maintained low. Capacitors C2 and C3 coupled across diodes D2 and D3, respectively, provide noise reduction.

Voltage level $+V_2$ is applied to a vertical deflection circuit output stage, not shown, for providing its supply energy. Advantageously, by utilizing the two diodes in series that reduce voltage level $+V_2$, winding 31 can be used for providing both voltage levels $+V_1$ and $+V_2$ at the required levels.

What is claimed is:

1. A power supply for a cathode ray tube of a video display apparatus, comprising:
   a reactive element;
   a source of an input supply voltage coupled to said reactive element;
   means coupled to said reactive element and responsive to a current or to a voltage developed at a first electrode of said cathode ray tube for generating first voltage pulses in said reactive element at a magnitude that is determined in accordance with a value of said reactive element and that is indicative of a magnitude of said first electrode current or voltage; and
   means responsive to said first voltage pulses and coupled to a cathode electrode of said cathode ray tube for generating a cathode electrode voltage in said cathode electrode in accordance with said first voltage pulses at a magnitude that varies both in accordance with said magnitude of said first electrode current or voltage and in accordance with said value of said reactive element in a manner to substantially reduce a variation in a black level associated with a video signal that is coupled to an electrode of said cathode ray tube when said variation of said first electrode current or voltage occurs.

2. A power supply according to claim 1 wherein said cathode electrode voltage generating means varies said magnitude of said cathode electrode voltage in accordance with an average beam current in said cathode ray tube.

3. A power supply according to claim 1 wherein said reactive element comprises a capacitor.

4. A power supply according to claim 3 wherein, for a given magnitude of a beam current, said magnitude of said first pulse voltages is established in accordance with a value of said capacitor that is selected to provide the black level compensation.

5. A power supply according to claim 3 wherein said source of said input supply voltage comprises a source of voltage supply pulses coupled to said capacitor for generating in a given cycle of said voltage supply pulses a corresponding current pulse in said capacitor at a first polarity that is coupled from said source of said voltage supply pulses to said cathode electrode voltage generating means such that a corresponding voltage pulse of said first voltage pulses is generated in said capacitor at a magnitude that is determined by a value of said capacitor.

6. A power supply according to claim 5 further comprising, means coupled to said capacitor for generating, during a portion of a cycle of said voltage supply pulses, a current pulse in said capacitor at a polarity that is opposite to said first polarity and a rectifier for decoupling said current pulse at said opposite polarity from said cathode electrode voltage generating means.

7. A power supply according to claim 5 wherein said cathode electrode voltage generating means comprises a first rectifier that is coupled to said capacitor for generating said cathode electrode voltage, in accordance with a difference between said voltage pulse of said first voltage pulses and a corresponding voltage supply pulse of said voltage supply pulses, by way of voltage rectification.

8. A power supply according to claim 5 wherein said source of said input supply voltage comprises a winding of a flyback transformer that is coupled in series with said capacitor.

9. A power supply according to claim 3 wherein said source of said input supply voltage comprises a winding of a flyback transformer for generating in said winding voltage supply pulses at a first polarity, during flyback intervals, that are coupled to said capacitor via a first terminal of said winding to generate current pulses in said capacitor at a first polarity and a first rectifier coupled to said capacitor for coupling through said rectifier said current pulses at said first polarity to a filter capacitor that develops an output supply voltage in said filter capacitor, said output supply voltage being coupled to said cathode electrode of said cathode ray tube via a supply terminal of a video driver stage.

10. A power supply according to claim 9, further comprising a second rectifier coupled to said first terminal for generating at a second terminal of said winding a second supply voltage outside said flyback intervals when a voltage that is developed at said winding is at an opposite polarity.

11. A power supply according to claim 3 further comprising, a resistor coupled in series with said capacitor for generating second voltage pulses in said resistor wherein said cathode electrode voltage generating means comprises a rectifier responsive to said first voltage supply pulses and to said second voltage pulses for generating said cathode electrode voltage in accordance with a sum of a magnitude of a given pulse of said first voltage supply pulses and a given pulse of said second voltage pulses.

12. A power supply for a cathode ray tube of a video display apparatus, comprising:

a source of first voltage supply pulses;

a capacitor coupled to said source of first voltage pulses;

means coupled to said capacitor for generating capacitor current pulses to transfer energy via said capacitor between said source of said first voltage pulses and a load that includes a cathode electrode of said cathode ray tube such that a change in a magnitude of a current in said cathode electrode produces a corresponding change in a magnitude of said capacitor current pulses, said capacitor current pulses producing second voltage pulses in said capacitor at a magnitude that is determined in accordance with said cathode electrode current such that for a given magnitude of said cathode electrode current said magnitude of said second voltage pulses is significantly determined by a value of said capacitor; and means coupled to said capacitor for generating a cathode electrode voltage in said cathode electrode in accordance with said second voltage pulses such that a change in said magnitude of said cathode electrode current produces a change in a magnitude of said cathode electrode voltage that is determined by said value of said capacitor in a manner to substantially reduce a change in a black level associated with a video signal that is coupled to an electrode of said cathode ray tube when said change in said cathode electrode current occurs.

13. A power supply for a cathode ray tube of a video display apparatus, comprising:

a source of first voltage supply pulses;

a capacitor coupled to said source; and a first rectifier coupled to said capacitor for generating current pulses that flow in said capacitor at a first polarity, such that a given current pulse is generated at said first polarity during a first portion of each cycle of said first voltage supply pulses when said first rectifier is conductive, to develop from said given current pulse a corresponding voltage pulse in said capacitor at a magnitude that is indicative of a magnitude of a beam current in said cathode ray tube such that for a given magnitude of said beam current said magnitude of said voltage pulse in said capacitor is determined in accordance with a value of said capacitor, said first rectifier being responsive to a corresponding voltage pulse of said first voltage supply pulses and to said voltage pulse in said capacitor for generating a cathode electrode voltage at a cathode electrode of said cathode ray tube at a magnitude that varies in accordance with a difference therebetween to provide black level compensation.

14. A power supply according to claim 13 further comprising, a resistor coupled in series with said capacitor for generating voltage pulses in said resistor that are combined with said voltage supply pulses and with voltage pulses generated in said capacitor by said first rectifier for generating said cathode electrode voltage in accordance with said voltage supply pulses, said voltage pulses in said resistor and said voltage pulses in said capacitor.

15. A power supply according to claim 3 further comprising, a second rectifier coupled to said capacitor for generating, during a second portion of each cycle, said current pulse of said current pulses that flows in said capacitor at a polarity that is opposite to that of said first polarity.

16. A power supply according to claim 13 wherein said source of said first voltage pulses comprises a winding of a flyback transformer having a first terminal that is remote from said capacitor and a second terminal that is coupled to said capacitor.

17. A power supply according to claim 16 wherein said current pulse at said first polarity is generated during a flyback interval and wherein said power supply further comprises, a second rectifier coupled to said second terminal for generating a DC supply voltage at said first terminal from a portion of said voltage supply pulses that occurs outside said flyback interval of each cycle.

18. A power supply according to claim 17 wherein said second rectifier comprises, a plurality of diodes coupled to said second terminal of said winding for developing a forward voltage drop therein that reduces a magnitude of said DC supply voltage at said first terminal.

19. A power supply for a cathode ray tube of a video display apparatus, comprising:
   a source of first voltage pulses;
   a load circuit that includes a cathode electrode of said cathode ray tube;
   a capacitor coupled between said source and said load for energizing said load via said capacitor from said source such that said source, said capacitor and said load are coupled in series, said capacitor developing second voltage pulses in said capacitor at a magnitude that is indicative of a cathode current in said cathode electrode such that for a given level of said cathode electrode current a magnitude of said second voltage pulses is determined in accordance with a value of said capacitor; and
   a rectifier coupled to said capacitor and to said load circuit for rectifying said first and second voltage pulses to produce a supply voltage that is coupled via a supply terminal of a video driver stage to said cathode electrode to develop at said cathode electrode a cathode electrode voltage that provides black level compensation.

20. A power supply for a cathode ray tube of a video display apparatus, comprising:
   a source of first voltage pulses;
   a capacitor responsive to a current that flows in a cathode electrode of said cathode ray tube for developing, during a first portion of a given period of said first voltage pulses, a voltage in said capacitor at a first magnitude that is indicative of a magnitude of said cathode electrode current and that is determined by a value of said capacitor;
   means coupled to said capacitor for developing said capacitor voltage, during a second portion of said period, at a second magnitude; and
   a rectifier responsive to said capacitor voltage for generating a voltage at said cathode electrode that varies in accordance with said capacitor voltage in a manner to substantially reduce a variation in a black level associated with a video signal that is coupled to an electrode of said cathode ray tube when a variation in said cathode electrode current occurs.

21. A power supply according to claim 20 wherein said source of said first voltage pulses comprises a winding of a horizontal flyback transformer and wherein said capacitor is coupled between an input terminal of said rectifier and a first terminal of said winding.

22. A power supply according to claim 21 further comprising a first diode coupled across said capacitor and a second diode coupled between a common conductor and a terminal that is coupled between said capacitor and said rectifier.

23. A power supply according to claim 22 wherein both said first and second diodes are conductive during a trace interval of a deflection cycle and nonconductive during a retrace interval of said deflection cycle and wherein, during said trace interval, said conductive diodes form a low impedance relative to said common conductor at said first terminal of said winding and rectify said first voltage pulses to produce a rectified voltage at a second terminal of said winding, during said trace interval.

* * * * *

UNITED STATES PATENT AND TRADEMARK OFFICE
CERTIFICATE OF CORRECTION

PATENT NO. : 5,034,666

DATED : July 23, 1991

INVENTOR(S) : JEFFERY BASIL LENDARO

It is certified that error appears in the above-identified patent and that said Letters Patent is hereby corrected as shown below:

Col. 6, Claim 15, first line -- "Claim 3" -- should be -- Claim 13 --.

Signed and Sealed this

Fifteenth Day of December, 1992

Attest:

DOUGLAS B. COMER

*Attesting Officer*  *Acting Commissioner of Patents and Trademarks*